United States Patent [19]

Uemura et al.

[11] Patent Number: 5,581,032

[45] Date of Patent: Dec. 3, 1996

[54] ANGULAR VELOCITY SENSOR DEVICE

[75] Inventors: Takeshi Uemura, Hirakata; Toshihiko Ichinose, Ikoma; Jiro Terada; Masaharu Ushihara, both of Hirakata; Junichi Yukawa, Osaka; Hiroaki Mouri, Neyagawa; Hideo Ohkoshi, Toyonaka; Masayoshi Murakami, Hirakata, all of Japan

[73] Assignee: Matsushita Electric Industrial Co., Ltd., Kadoma, Japan

[21] Appl. No.: 399,452

[22] Filed: Mar. 7, 1995

[30] Foreign Application Priority Data

Apr. 21, 1994 [JP] Japan .................................. 6-083111

[51] Int. Cl.$^6$ ........................................................ G01P 1/02
[52] U.S. Cl. ................................................ 73/493; 73/526
[58] Field of Search ............................. 73/493, 504.04, 73/504.12, 504.16, 431, 526; 248/560, 904

[56] References Cited

U.S. PATENT DOCUMENTS

| | | | |
|---|---|---|---|
| 4,873,867 | 10/1989 | McPherson et al. | 73/493 |
| 4,920,799 | 5/1990 | Low | 73/493 |
| 5,014,554 | 5/1991 | Terada et al. | 73/504.16 |
| 5,038,613 | 8/1991 | Takenaka et al. | 73/510 |
| 5,212,985 | 5/1993 | Takenaka et al. | 73/504.16 |
| 5,233,873 | 8/1993 | Mozgowiec et al. | 73/493 |
| 5,239,866 | 8/1993 | Froidevaux | 73/526 |
| 5,379,640 | 1/1995 | Yamamoto | 73/493 |

FOREIGN PATENT DOCUMENTS

| | | |
|---|---|---|
| 0520467 | 12/1992 | European Pat. Off. . |
| 557917A1 | 2/1993 | European Pat. Off. ................. 73/493 |
| 4236321 | 8/1992 | Japan . |

OTHER PUBLICATIONS

Search Report for European Appl. 95103314.1, mailed Jul. 20, 1995.

*Primary Examiner*—Hezron E. Williams
*Assistant Examiner*—Richard A. Moller
*Attorney, Agent, or Firm*—Renner, Otto, Boisselle & Sklar, P.L.L.

[57] ABSTRACT

In an angular velocity sensor device, a vibration isolation member, a sensor support plate on which a tuning fork unit functioning as a vibrating type angular velocity sensor is mounted, a collar, a circuit board on which a circuit pattern is formed for driving the tuning fork unit and processing a signal output therefrom are provided by having a plurality of pins inserted, in this order, which extend from the bottom surface of a concave-shaped case. The circuit pattern and the tuning fork unit are connected with each other via a flexible printed circuit board. These components are accommodated inside the concave-shaped case. A cover is fitted in an open top of the case so as to completely seal the case. The angular velocity sensor device with the aforementioned arrangement does not suffer variation in the operational properties due to disturbance vibration and deterioration in the vibration isolation property. In addition, adverse effects of moisture and corrosive gas in the atmosphere on the operational properties are prevented, since air is prevented from entering the inside of the case.

9 Claims, 7 Drawing Sheets

5,581,032

ANGULAR VELOCITY SENSOR DEVICE

BACKGROUND OF THE INVENTION

1. Field of the Invention

The present invention relates to an angular velocity sensor device used in an attitude control apparatus and in a navigation system for mobiles such as airplanes, cars, and other vehicles.

2. Description of the Related Art

One example of a conventional angular velocity sensor device is disclosed in Japanese Laid-Open Patent Publication No. 4-236321. The angular velocity sensor device includes an angular velocity sensor, a circuit board having a circuit for driving the angular velocity sensor and processing a signal output from the angular velocity sensor, a holding plate for holding both the angular velocity sensor at the longitudinal ends thereof via shock absorbers and the circuit board, and a case for accommodating the angular velocity sensor, the circuit board, and the holding plate as one unit.

The conventional angular velocity sensor device having the above structure will be described with reference to FIGS. 8 to 10.

FIG. 8 is an exploded perspective view of a conventional angular velocity sensor device 15 where a case 11 is removed from a body 12. FIG. 9 is a side view of the body 12. FIG. 10 is a perspective view of a base 8 of the body 12, which is the main portion of the conventional angular velocity sensor device 15.

Referring to FIGS. 8 and 9, an angular velocity sensor 1 is secured to a holder 2. A sub circuit board 4 is mounted around and connected to an output terminal 3 of the angular velocity sensor 1. The sub circuit board 4 is connected via a lead 5 to a main circuit board 6 mounted on the base 8, thereby realizing the connection of the angular velocity sensor 1 with a circuit pattern (not shown) formed on the main circuit board 6.

Three leads 7a, 7b, and 7c are connected to the main circuit board 6 for inputting/outputting signals and grounding, respectively. In FIG. 9, these leads 7a, 7b, and 7c are collectively denoted as a lead 7 for simplification.

The base 8 shown in more detail in FIG. 10 also works as a holder for the angular velocity sensor 1. For this purpose, the base 8 includes a pair of sensor holding portions 8a which have respective recesses 8b opposing each other. First and second shock absorbers 9 and 10 are pressed into and attached to the respective recesses 8b at one end. The other end of the first shock absorber 9 is pressed into and attached to the holder 2 of the angular velocity sensor 1. The other end of the second shock absorber 10 is connected with the output terminal 3 of the angular velocity sensor 1.

The body 12 is mainly composed of the angular velocity sensor 1, the main circuit board 6, and the base 8 and is accommodated in the case 11, so as to complete the angular velocity sensor device 15. As is apparent from the above description, the angular velocity sensor 1 of the conventional angular velocity sensor device 15 is held at the longitudinal ends by the sensor holding portions 8a of the base 8 via the shock absorbers 9 and 10.

SUMMARY OF THE INVENTION

The angular velocity sensor device of this invention includes: a concave-shaped case having an open top; a plurality of pins extending from a bottom surface of the case toward the open top substantially perpendicularly to the bottom surface; a plurality of vibration isolation members each having a constriction portion and fitted on each of the plurality of pins so as to be fixed at a predetermined position of the pin; a sensor support plate receiving the constriction portions of the plurality of vibration isolation members so as to be fixed; a vibrating type angular velocity sensor mounted on the sensor support plate; a plurality of collars fitted on the plurality of pins so as to be located on the plurality of vibration isolation members; a circuit board fitted on the plurality of pins so as to be located on the plurality of collars, signal processing means being mounted on at least one surface of the circuit board for driving the vibrating type angular velocity sensor and processing an output signal from the vibrating type angular velocity sensor; connection means for electrically connecting the signal processing means and the vibrating type angular velocity sensor; and a cover fitted in the open top of the case for sealing the inside of the case.

In one embodiment of the present invention, the vibrating type angular velocity sensor includes a pair of vibration tongues and a metal block disposed between the pair of vibration tongues, each of the pair of vibration tongues including: a detection portion having a first metal plate with a plurality of through holes formed therein and a first piezoelectric member attached to the first metal plate; and a driving portion having a second metal plate and a second piezoelectric member attached to the second metal plate, the detection portion and the driving portion being arranged so as to face directions displaced at right angles to each other.

In another embodiment of the present invention, a T-shaped fastener is attached to the sensor support plate, wherein a support pin extending from the metal block of the vibrating type angular velocity sensor is inserted into the T-shaped fastener so as to mount the vibrating type angular velocity sensor onto the sensor support plate.

In still another embodiment of the present invention, the connection means is a flexible printed circuit board.

In still another embodiment of the present invention, the sensor support plate is formed of foam material.

In still another embodiment of the present invention, the plurality of vibration isolation members are fitted onto the plurality of pins after being compressed in the axis direction of the vibration isolation members.

Thus, the invention described herein makes possible the advantage of providing an angular velocity sensor device capable of minimizing deterioration in the operational properties and in the life thereof caused by various external factors, such as adverse effects to the operation due to disturbance vibration, variations in the operational properties caused by electric leakage of a circuit board due to corrosion of and condensation of water at the circuit board by the contact with air, and deterioration in the vibration isolation property due to ice accretion.

This and other advantages of the present invention will become apparent to those skilled in the art upon reading and understanding the following detailed description with reference to the accompanying figures.

DESCRIPTION OF THE PREFERRED EMBODIMENTS

The angular velocity sensor device of the present invention will be described by way of example with reference to the accompanying drawings.

Figure 1:
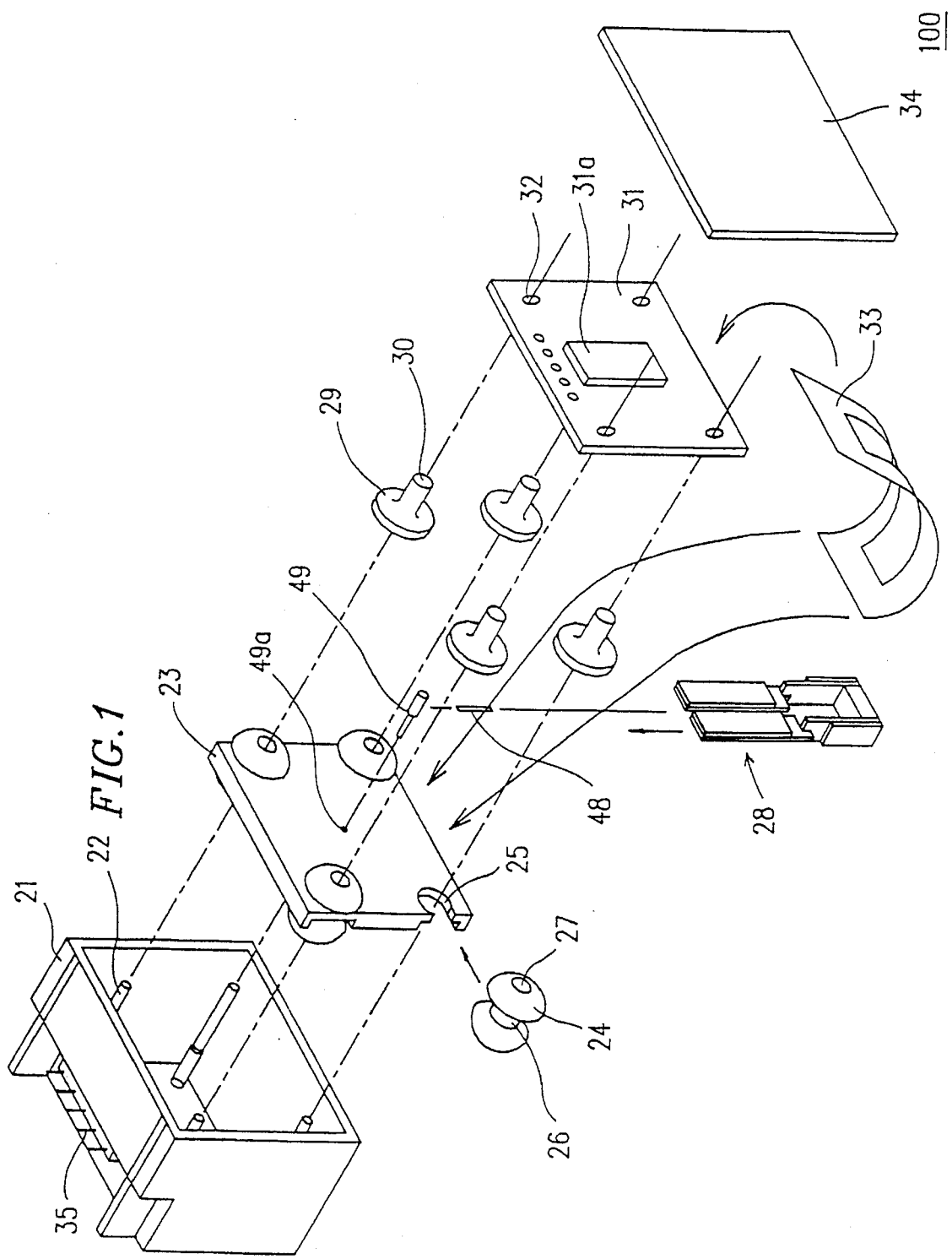
FIG. 1 is an exploded perspective view of an angular velocity sensor device according to one embodiment of the present invention.
Figure 2:
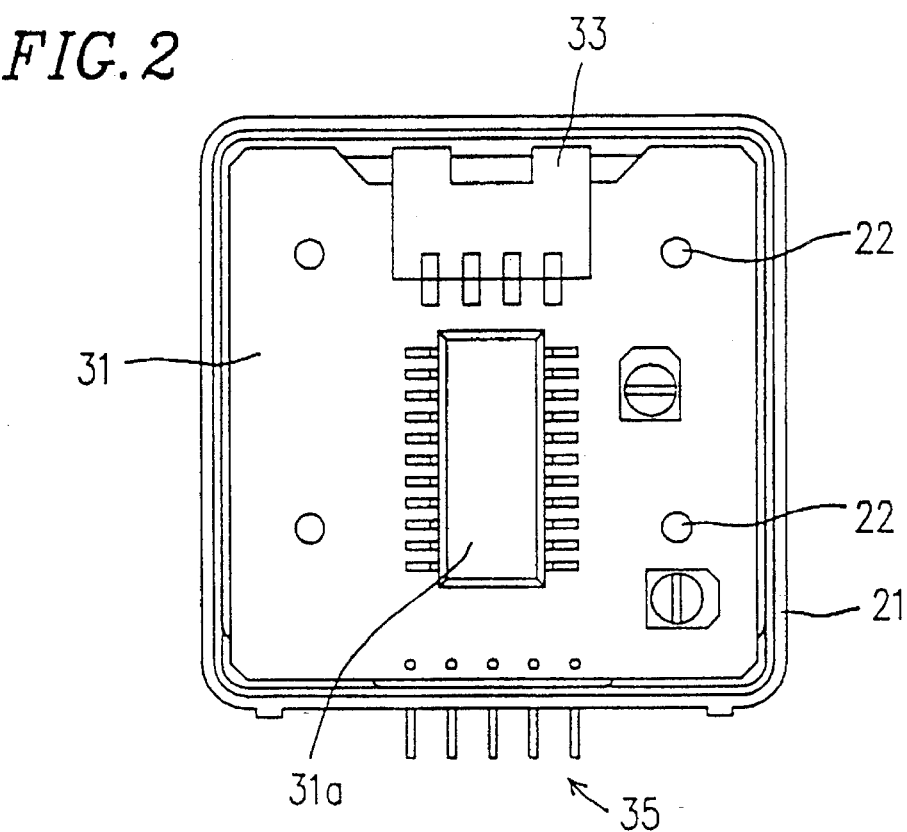
FIG. 2 is a top plan view of the angular velocity sensor device of FIG. 1, where the cover is removed, exposing the top surface of a circuit board.
Figure 3:
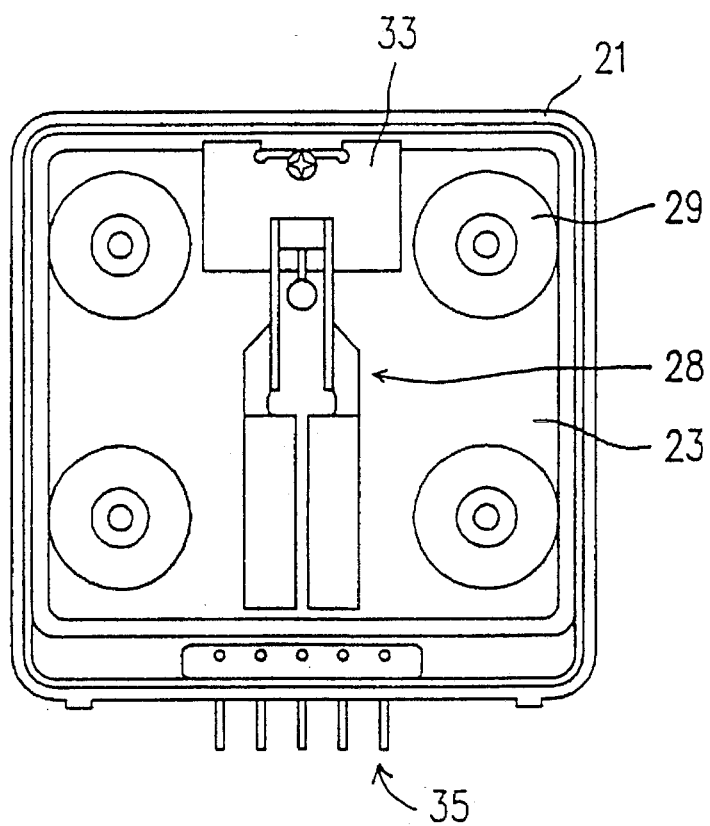
FIG. 3 is a top plan view of the angular velocity sensor device of FIG. 1, where the circuit board is removed from the state shown in FIG. 2, exposing the top surface of a sensor support plate.
Figure 4:
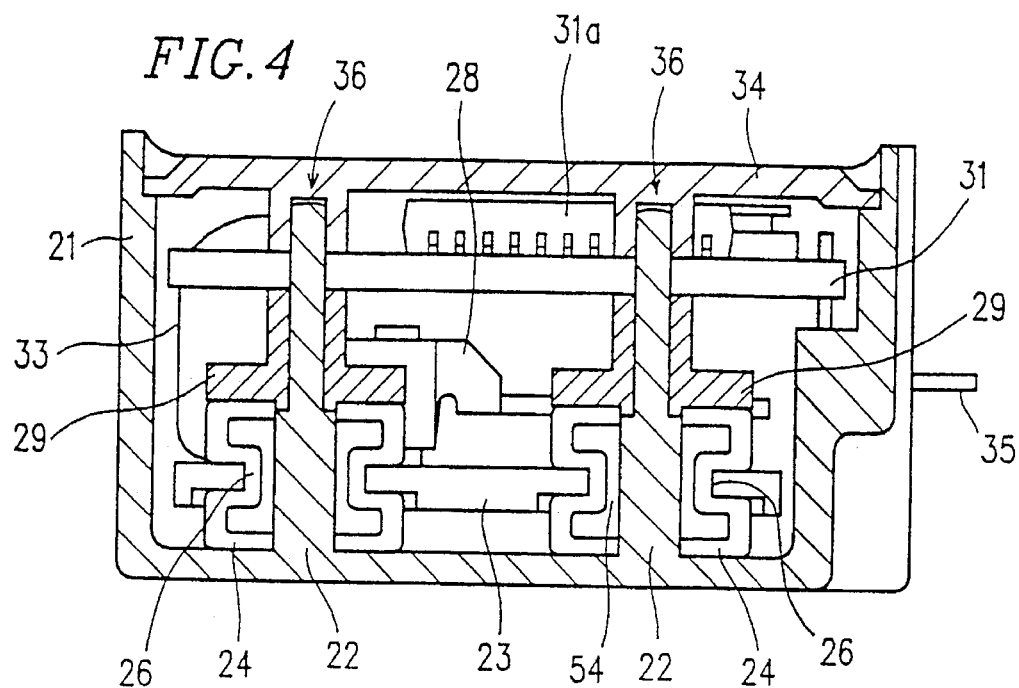
FIG. 4 is a sectional view of the angular velocity sensor device of FIG. 1.

FIG. 1 is an exploded perspective view of an angular velocity sensor device 100 according to one embodiment of the present invention. FIGS. 2 and 3 are top plan views of the angular velocity sensor device 100. In FIG. 2, a cover 34 has been removed, exposing the top surface of a circuit board 31. In FIG. 3, the circuit board 31 has been removed, exposing the top surface of a sensor support plate 23. FIG. 4 is a sectional view of the angular velocity sensor device 100.

Referring to FIGS. 1 to 4, the components of the angular velocity sensor device 100 are accommodated in a concave-type case 21 of molded resin. The case 21 includes a bottom surface and side walls extending from the peripheries of the bottom surface substantially perpendicularly thereto. The case 21 is open at the top thereof. The open top is covered with the cover 34. Four pins 22 are disposed on the bottom surface of the case 21 so that they extend substantially perpendicularly from the bottom surface toward the open top. Each of the pins 22 has a lower first portion adjacent to the bottom surface of the case 21 and an upper second portion including a free end of the pin. The diameters of the first and second portions are different from each other, forming a step at the boundary. The diameter of the upper second portion is smaller than that of the lower first portion.

Furthermore, electric signal terminals 35 are provided to extend from the inside to the outside of the case 21 through a side face of the case 21, keeping the case 21 airtight at the connecting portions.

The case 21 is preferably formed of engineering plastics such as polybutylene terephthalate (PBT) and polyphenylene sulfide (PPS). PBT is particularly preferable in consideration of thermal stability, mechanical strength, easiness in molding, and electric insulation property.

The sensor support plate 23 of which the top surface is shown in FIG. 3 is mounted in the case 21. The outer profile of the sensor support plate 23 corresponds to the inner profile of the case 21. Cuts 25 are formed at positions close to both ends of two opposing edges of the sensor support plate 23, for receiving vibration isolation members 24 to be described later. Furthermore, a tuning fork unit 28 as a vibrating type angular velocity sensor is mounted on the sensor support plate 23.

The sensor support plate 23 may be formed of ceramic, engineering plastics, metal such as brass or iron, or foam material such as foam metal. The sensor support plate 23 is preferably formed of a metal plate having a mass about ten times as large as that of the tuning fork unit 28 and having mechanical strength large enough to support the tuning fork unit 28. Brass is particularly preferable in consideration of easiness in processing, anti-corrosion property, mechanical strength, high vibration absorption capability, and the assurance of an appropriate mass for vibration absorption.

In the case where the sensor support plate 23 is formed of a foam metal or other foam materials having bubbles dispersed therein, vibration transmitted through the sensor support plate 23 is gradually absorbed by the bubbles during the transmission. This results in improving the damping effect of disturbance vibration.

Each of the vibration isolation members 24 to be fitted into the cuts 25 of the sensor support plate 23 has a roughly cylindrical shape with a constriction portion 26 formed in the middle. The constriction portion 26 is fitted into each of the respective cuts 25 so as to attach each of the vibration isolation members 24 to the sensor support plate 23.

Each of the vibration isolation members 24 also has a through hole 27 extending vertically to a plane including the constriction portion 26, i.e., in the axis direction. Each of the pins 22 disposed on the bottom surface of the case 21 extends through the respective through holes 27. The sensor support plate 23 is thus mounted in the case 21 by allowing the pins 22 to extend through the respective through holes 27 of the vibration isolation members 24 fitted into the respective cuts 25 of the sensor support plate 23.

The vibration isolation members 24 preferably have a mechanical strength large enough to support the sensor support plate 23 with the tuning fork unit 28 mounted thereon. Also, the vibration isolation members 24 preferably have a hollow structure (thickness: about 1.0 mm), and are pre-compressed along the through holes 27 (i.e., in the axis direction) by about 15% before use. This pre-compression is conducted so that spaces 54 (see FIG. 4) can be appropriately maintained between the vibration isolation members 24 and the pins 22 by the self-weights of the tuning fork unit 28 and the sensor support plate 23, thereby realizing and maintaining a high damping effect. The hollow structure is also effective for achieving a high damping effect since it enables the reduction in rigidity to the same low level in all directions including upwards and downwards.

The vibration isolation members 24 may be formed of silicone rubber, butyl rubber, or urethane rubber. Silicone rubber is particularly preferable in consideration of the temperature characteristics.

Collars 29 are disposed on the respective vibration isolation members 24 fitted into the sensor support plate 23. Each of the collars 29 has a through hole 30 for allowing the pin 22 to extend therethrough. The diameter of the through hole 30 is set so that the upper second portion of the pin 22 is allowed to extend therethrough while the lower first portion of the pin 22 is not allowed to extend therethrough. Thus, the collars 29 with the respective pins 22 extending therethrough are located at the stepped boundaries of the pins 22.

The collars 29 are preferably formed of a rigid body having a mechanical strength and a plane area large enough to compress the vibration isolation members 24 and having a resonance frequency higher than that of the vibration isolation members 24. Specifically, engineering plastics such as PBT and PPS or metal may be used. PBT is particularly preferable in consideration of the thermal stability and the easiness of molding.

The circuit board 31 of which the top surface is shown in FIG. 2 is mounted on the collars 29. The collars 29 hold the circuit board 31, while the pins 22 extend through respective through holes 32 of the circuit board 31 formed at predetermined positions thereof. Thus, the circuit board 31 is mounted in the case 21. A circuit pattern (not shown in detail) including an IC 31a, for example, is formed on one surface or both surfaces of the circuit board 31 for driving the tuning fork unit 28 and processing a signal output from the tuning fork unit 28.

Flexible wiring 33 is provided between the tuning fork unit 28 (see FIG. 3) on the sensor support plate 23 and the circuit pattern on the circuit board 31 (see FIG. 4). The flexible wiring 33 is preferably a flexible printed circuit board with a thickness of about 50 μm, where an output signal circuit and a driving signal circuit are separately arranged. Thus, the tuning fork unit 28 and the circuit board 31 (circuit pattern) are electrically connected, and variations in the voltage of an output signal which may be caused by a change in the capacitive coupling between the tuning fork unit 28 and the circuit board 31 and/or between the output signal circuit and the driving signal circuit is prevented. The flexible printed circuit board may be formed of polyimide or polyethylene terephthalate fiber. The polyethylene terephthalate fiber is available under the general trade designation "Tetron". Polyimide is particularly preferable in consideration of the thermal resistance.

Finally, as shown in FIG. 4, the cover 34 is fitted into the open top of the case 21 to cover and seal the case 21. Protrusions 36 having bores for receiving the respective pins 22 are formed on the back surface of the cover 34. The pins 22 are inserted into the bores, and thus the cover 34 is mounted on the case 21. At this mounting of the cover 34, the case 21 is preferably charged with dry inert gas such as nitrogen gas and sealed.

The cover 34 may be formed of engineering plastics such as PBT and PPS. PBT is particularly preferable in consideration of the thermal stability, the mechanical strength, the easiness in molding, and the electric insulation property.

Then, the tuning fork unit 28 operating as a vibrating type angular velocity sensor for the angular velocity sensor device 100 of the present invention will be described.

Figure 5:
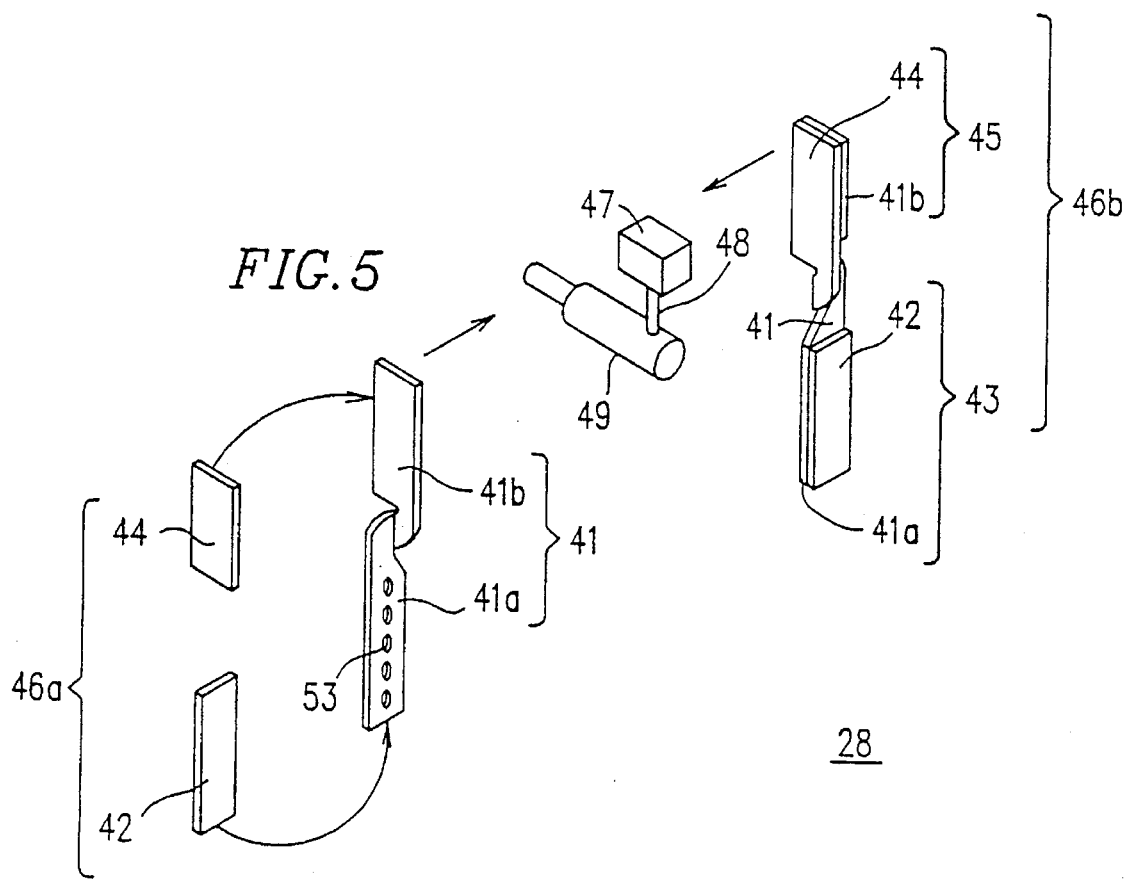
FIG. 5 is an exploded perspective view of a tuning fork unit (angular velocity sensor) included in an angular velocity sensor device according to the present invention.

FIG. 5 is an exploded perspective view of the tuning fork unit 28. Referring to FIG. 5, the tuning fork unit 28 includes a pair of vibration tongues 46a and 46b and a metal block 47. The structures of the vibration tongues 46a and 46b are the same, and they are symmetrical to each other. FIG. 5 illustrates the vibration tongue 46a as an exploded diagram so as to clearly show the structure thereof.

Each of the vibration tongues 46a and 46b includes a metal plate 41 and piezoelectric members 42 and 44. The metal plate 41 is composed of a first metal plate 41a and a second metal plate 41b facing directions displaced at right angles to each other. Each of the vibration tongues 46a and 46b is composed of a detection portion 43 including the first metal plate 41a and the piezoelectric member 42 and a driving portion 45 including the second metal plate 41b and the piezoelectric member 44. The metal plate 41 may be formed of one metal plate by pressing the metal into the above shape, or may be formed of two metal plates coupled so as to be displaced at right angles. Then, the piezoelectric members 42 and 44 are attached to the first metal plate 41a of the detection portion 43 and the second metal plate 41b of the driving portion 45, respectively, thereby completing each of the vibration tongues 46a and 46b.

A plurality of through holes 53 are formed, for example, in a row in the first metal plate 41a of the detection portion 43 along the axis of the metal plate 41. This increases the sensitive strain force received by the piezoelectric member 42 attached to the first metal plate 41a and thus enhances the detection sensitivity of the angular velocity at the detection portion 43.

Arrangement of the plurality of through holes 53 is not limited to the above explanation in which they are formed in a row. Alternatively, the through holes 53 may be arbitrarily arranged in other patterns such as in dual lines, or may be arranged even in irregular pattern.

The vibration tongues 46a and 46b are arranged so as to be symmetrical to each other with regard to the plane including the center axis of the vibration of the tuning fork and parallel to the second metal plates 41b. The second metal plate 41b of each of the vibration tongues 46a and 46b is then attached by adhesive to the metal block 47 placed at the center axis of vibration of the tuning fork so as to be electrically connected to each other. The metal block 47 is then fixed to a support 49 via a support pin 48 extending from the metal block 47. Thus, the tuning fork unit 28 is completed.

The tuning fork unit 28 is mounted on the sensor support plate 23 via the support 49. In the illustrated example, as shown in FIG. 1, a hole 49a is formed at a predetermined position on the sensor support plate 23. The support 49 is inserted into the hole 49a so as to mount the tuning fork unit 28 on the sensor support plate 23.

Typically, the metal plate 41 is made of elinvar, and the piezoelectric members 42 and 44 are made of ceramic. The metal block 47, the support pin 48 and the support 49 are typically made of iron, respectively.

The operation of the angular velocity sensor device 100 having the above structure will be described.

Figure 6:
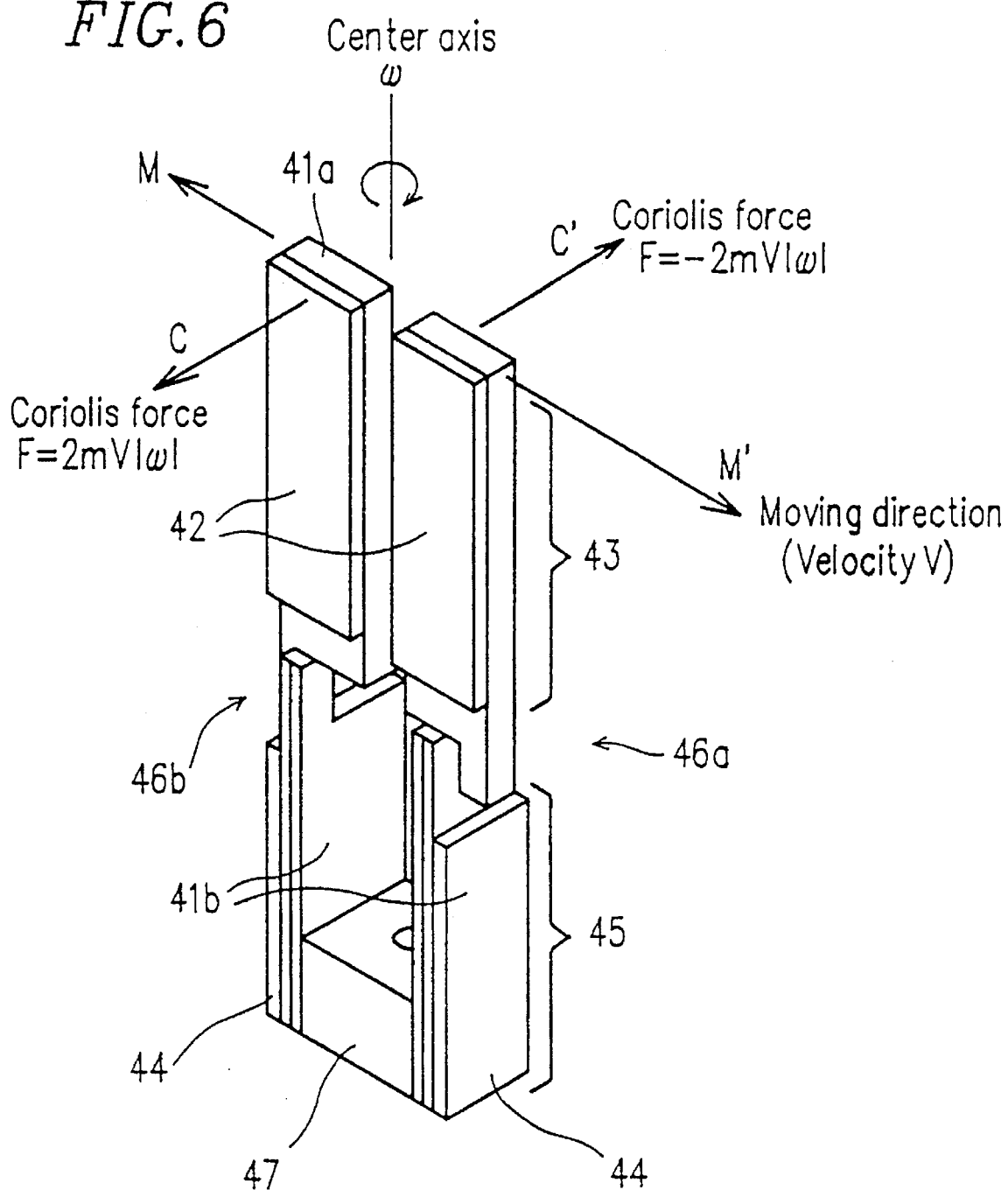
FIG. 6 is a diagram schematically illustrative of the operation principle of the tuning fork unit of FIG. 5.

First, the operation principle of the tuning fork unit 28 will be described with reference to FIG. 6. The tuning fork unit 28 shown in FIG. 6 has the same structure as the tuning fork unit 28 of FIG. 5, though the support pin 48 and the support 49 are omitted for simplification In FIG. 6, in order to examine the action of a force generated when an input angular velocity is given, it is assumed that a revolution with an angular velocity ω is applied around the center axis under the condition where the entire tuning fork unit 28 is in the curvature vibration in the directions M—M' at a driving velocity V. At this time, a Coriolis force F generated in the directions C—C' vertical to the directions M—M' of the driving velocity V is expressed by the formula F=2 mVω where m is the mass of the material particle. Since the mass m and the driving velocity V in the above formula are known, the angular velocity ω given to the tuning fork unit 28 can be obtained from the above formula F=2 mVω by detecting the Coriolis force F.

The Coriolis force F is detected with the piezoelectric members 42 attached to the first metal plates 41a of the detection portions 43 of the tuning fork unit 28. When the first metal plates 41a are distorted in the thickness direction thereof by the Coriolis force, the piezoelectric members 42 of the detection portions 43 receive a distortion due to the extension and contraction of the first metal plates 41a. This distortion generates an amount of charge corresponding to the magnitude of the Coriolis force F. Accordingly, an electric signal corresponding to the Coriolis force F can be obtained by detecting the amount of the charge with a known method in the art. The electric signal generated in the piezoelectric members 42 is then transmitted to the signal processing circuit mounted on the circuit board 31 via the flexible wiring 33 and processed in a known manner, so as to obtain the input angular velocity ω given to the tuning fork unit 28.

Figure 7:
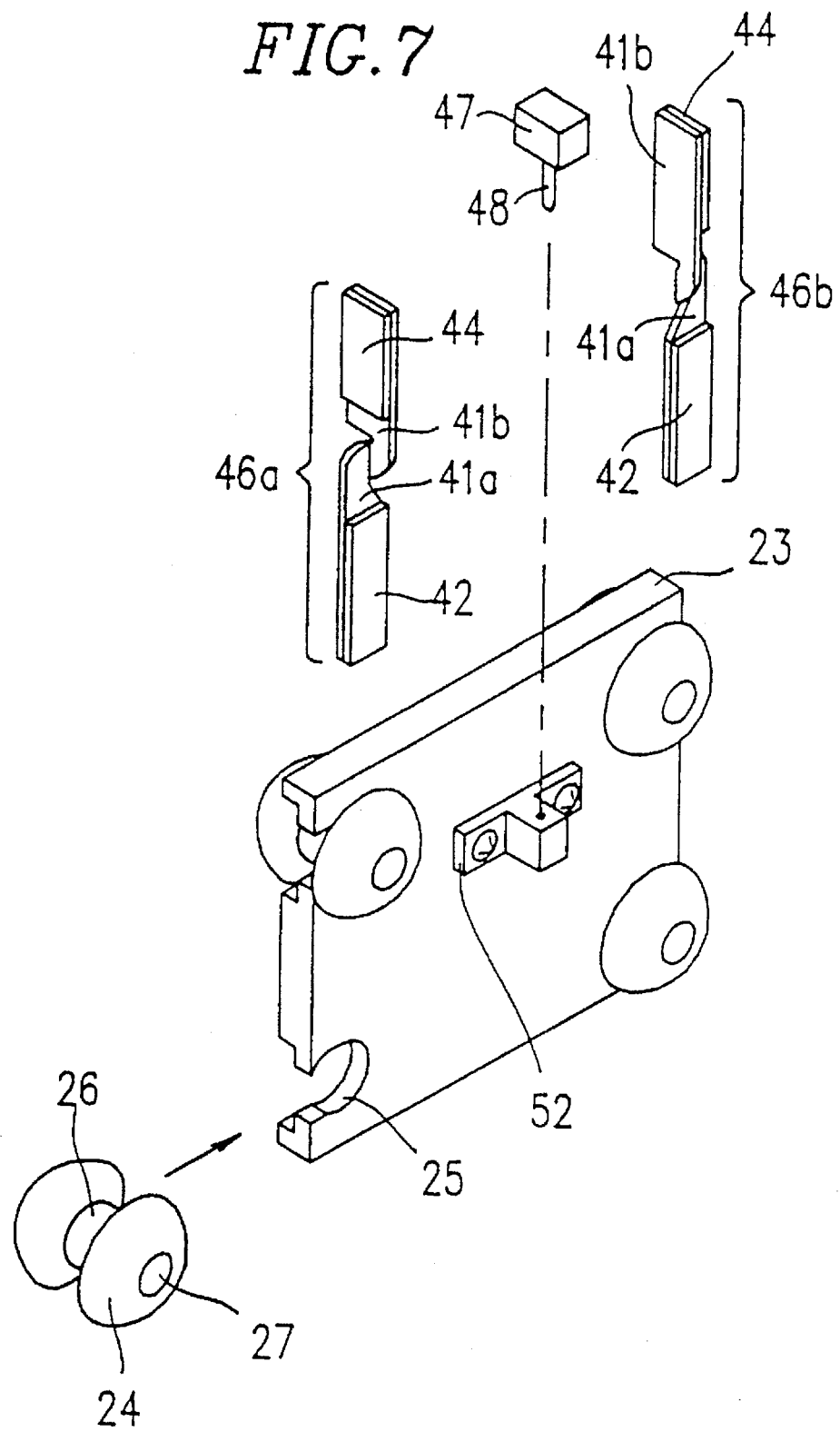
FIG. 7 is a diagram schematically illustrative of another method for mounting a tuning fork unit on a sensor support plate for an angular velocity sensor device according to the present invention.

In the illustrated example, the tuning fork unit 28 is mounted on the sensor support plate 23 by attaching the driving portions 45 of the vibration tongues 46a and 46b to the metal block 47 with an adhesive, fixing the metal block 47 to the support 49 via the support pin 48 extending from the metal block 47, and inserting the support 49 into the hole 49a of the sensor support plate 23. Alternatively, as shown in FIG. 7, instead of using the support 49, a T-shaped fastener 52, typically made of brass, may be attached to the sensor support plate 23 so that the support pin 48 of the tuning fork unit 28 can be inserted into the fastener 52. The use of the T-shaped fastener 52 enhances the rigidity of the tuning fork unit 28 in the supported situation. This advantageously absorbs unnecessary vibration components and thus reduces the variation in the output voltage due to disturbance vibration. In this alternative example of the tuning fork unit shown in FIG. 7, the components other than those described above are the same as those of FIG. 5.

In both the examples shown in FIGS. 5 and 7, the tuning fork unit 28 is supported by the sensor support plate 23 which is mounted in the case 21 via the vibration isolation members 24. The use of the vibration isolation members 24 damps disturbance vibration transmitted to the case 21, thereby minimizing adverse effects thereof on the tuning fork unit 28 mounted on the sensor support plate 23. The effect of damping disturbance vibration can also be obtained by using a flexible printed circuit board with a low rigidity for the connection between the sensor support plate 23 and the circuit board 31. This is because the flexible printed circuit board prevents disturbance vibration from being transmitted between the sensor support plate 23 and the circuit board 31. Moreover, the effect of damping disturbance vibration is further improved by using foam material such as foam metal for the sensor support plate 23 and/or by supporting the sensor support plate 23 by the vibration isolation members 24 compressed in the axis direction, as described above.

Thus, in the angular velocity sensor device 100 of the present invention, unnecessary vibration components are removed and the stability against disturbance vibration is enhanced.

Figure 8:
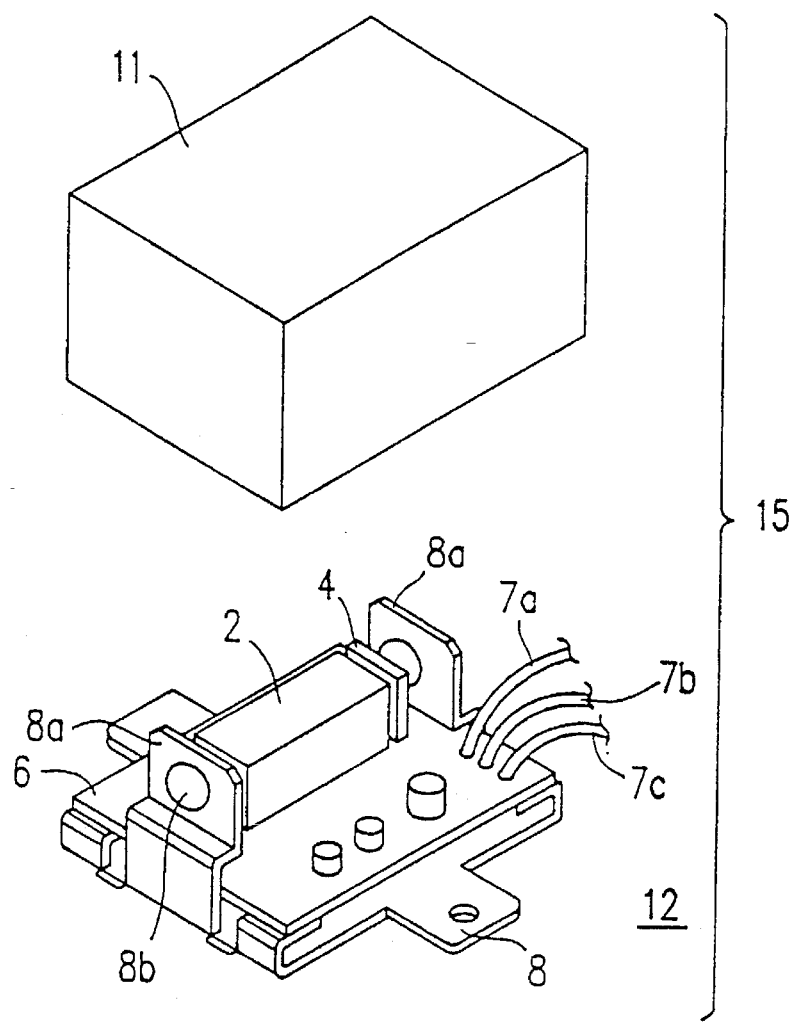
FIG. 8 is an exploded perspective view of a conventional angular velocity sensor device, where the case is removed, exposing the body.
Figure 9:
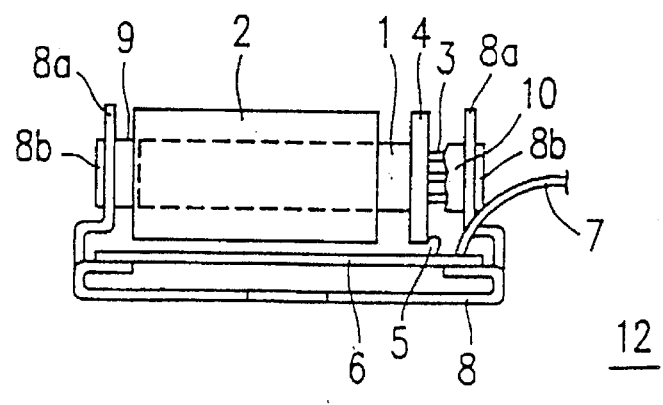
FIG. 9 is a side view of the body for the angular velocity sensor device of FIG. 8.
Figure 10:
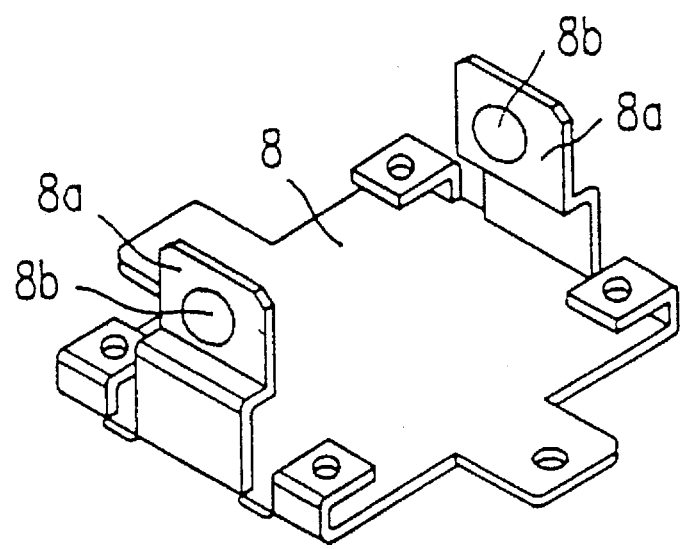
FIG. 10 is a perspective view of a base for the angular velocity sensor device of FIG. 8.

Now, the angular velocity sensor device 100 of the present invention is compared with a conventional angular velocity sensor device 15 described above with reference to FIGS. 8 to 10.

In the conventional angular velocity sensor device 15, the angular velocity sensor 1 secured to the holder 2 is held along the longitudinal direction by the sensor holding portions 8a of the base 8 and the recesses 8b formed on the sensor holding portions 8a via the shock absorbers 9 and 10. This conventional structure is durable against lengthwise vibration of the angular velocity sensor 1, but susceptive to rotational vibration, in particular, the rotational vibration generated around the center of the angular velocity sensor 1.

Also, in the conventional angular velocity sensor device 15, the body 12 composed of the angular velocity sensor 1, the main circuit board 6, the base 8, and the like is simply covered with the case 11. This structure makes it difficult to keep the inside of the case 11 airtight. Therefore, air may enter the inside of the case 11, causing corrosion of the surfaces of the angular velocity sensor 1 and electric leakage due to condensation of water. The air in the case 11 may also form ice accretion on the shock absorbers 9 and 10, significantly deteriorating the vibration isolation effect of the shock absorbers 9 and 10.

On the other hand, in the angular velocity sensor device 100 of the present invention, the sensor support plate 23 with the tuning fork unit 28 mounted thereon is supported at four corner points by the pins 22 via the vibration isolation members 24, and the vibration isolation members 24 are compressed by the collars 29 located above. This provides a high vibration isolation effect, as well as minimizing the adverse effect of disturbance vibration received at the center axis of the tuning fork unit 28. Thus, an angular velocity sensor device where the variation in the output voltage due to disturbance vibration is minimized can be obtained.

In addition, the device can also be made smaller and lighter than conventional devices.

The variation in the output voltage due to disturbance vibration can be further reduced by various methods: for example, using the T-shaped fastener 52 for mounting the tuning fork unit 28 on the sensor support plate 23; using a flexible printed circuit board with a low rigidity for the connection between the sensor support plate 23 and the circuit board 31; using foam material for the sensor support plate 23; compressing the vibration isolation members 24 supporting the sensor support plate 23 in the axis direction.

With the above effects obtained according to the present invention, an angular velocity sensor device with a higher output resolution can be provided.

Furthermore, in the angular velocity sensor device 100 of the present invention, the case 21 can be easily closed airtightly with the cover 34, after the components are accommodated in the case 21. This prevents air from entering the inside of the case 21. The airtightness is further ensured by charging the case 21 with a dry inert gas such as nitrogen gas.

Accordingly, disadvantages of the conventional technique can be minimized, such as condensation of water and resultant electric leakage at the circuit board 31, deterioration of the vibration isolation property due to ice accretion on the vibration isolation members 24, and variations with time in various operational properties caused by corrosion of the circuit board 31 due to corrosive gas components in the air. As a result, there can be provided an angular velocity sensor device with a simpler structure exhibiting more excellent operational properties under severe temperature and humidity conditions and in the atmosphere containing corrosive gas (air pollution gas such as $SO_2$), compared with the conventional devices.

Furthermore, different types of the angular velocity sensors can be used other than the one described above. For example, it is possible to use an angular velocity sensor which includes vibrating members having the shape of a column, a triangular pillar, a square pillar, and the like, instead of metal plates.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An angular velocity sensor device comprising:

a concave-shaped case having an open top;

a plurality of pins extending from a bottom surface of the case toward the open top substantially perpendicularly to the bottom surface;

a plurality of vibration isolation members each receiving a respective one of the plurality of pins so as to be fixed at a predetermined position of the pin, the plurality of vibration isolation members each having a constriction portion;

a sensor support plate receiving the constriction portions of the plurality of vibration isolation members so as to be fixed;

a vibrating type angular velocity sensor mounted on the sensor support plate;

a plurality of collars each having a through hole for receiving a respective one of the plurality of pins so as to be located on a corresponding one of the plurality of vibration isolation members;

a circuit board fitted on the plurality of pins so as to be located on the plurality of collars, signal processing means being mounted on at least one surface of the circuit board for driving the vibrating type angular velocity sensor and processing an output signal from the vibrating type angular velocity sensor;

connection means for electrically connecting the signal processing means and the vibrating type angular velocity sensor; and a cover fitted in the open top of the case for sealing the inside of the case, wherein each of the vibration isolation members damps vibration of the concave-shaped case so as to provide vibration isolation between the concave-shaped case and the sensor support plate.

2. An angular velocity sensor device according to claim 1, wherein the vibrating type angular velocity sensor includes a pair of vibration tongues and a metal block disposed between the pair of vibration tongues, each of the pair of vibration tongues including:

a detection portion having a first metal plate with a plurality of through holes formed therein and a first piezoelectric member attached to the first metal plate; and a driving portion having a second metal plate and a second piezoelectric member attached to the second metal plate, the detection portion and the driving portion being arranged so as to face directions displaced at right angles to each other.

3. An angular velocity sensor device according to claim 2, further comprising a T-shaped fastener attached to the sensor support plate, wherein a support pin extending from the metal block of the vibrating type angular velocity sensor is inserted into the T-shaped fastener so as to mount the vibrating type angular velocity sensor onto the sensor support plate.

4. An angular velocity sensor device according to claim 1, wherein the connection means is a flexible printed circuit board.

5. An angular velocity sensor device according to claim 1, wherein the sensor support plate is formed of foam material.

6. An angular velocity sensor device according to claim 1, wherein the plurality of vibration isolation members each have an axis and are fitted onto the plurality of pins along the direction of the axis after being compressed in the direction of the axis.

7. An angular velocity sensor device according to claim 1, wherein each of the vibration isolation members has a hollow structure.

8. An angular velocity sensor device according to claim 1, wherein each of the vibration isolation members is made of a material selected from the group consisting of silicone rubber, butyl rubber and urethane rubber.

9. An angular velocity sensor device according to claim 1, wherein each of the pins has a lower first portion and an upper second portion, the lower first portion having a diameter larger than that of the upper second portion so as to form a stepped boundary between the lower first portion and the upper second portion, and each of the collars is located at the stepped boundary of each of the pins so as to hold each of the vibration isolation members fixed at the predetermined position of each of the pins in a compressed condition.

* * * * *